Oct. 15, 1957     T. D. NATHAN     2,809,853
PIPE AND SOCKET WITH FLEXIBLE LIP GASKET
Filed March 31, 1954
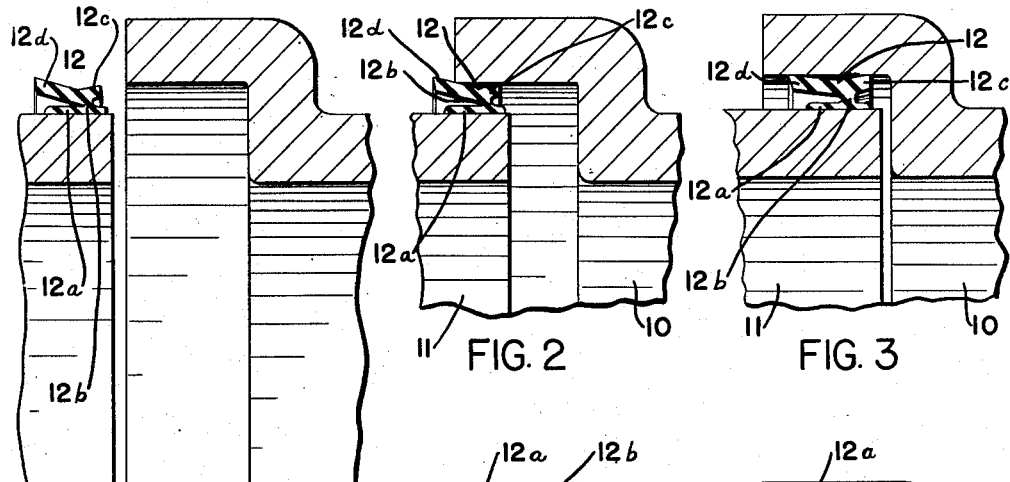
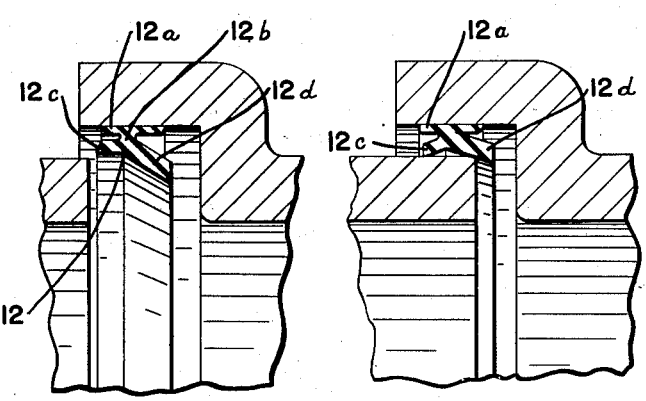
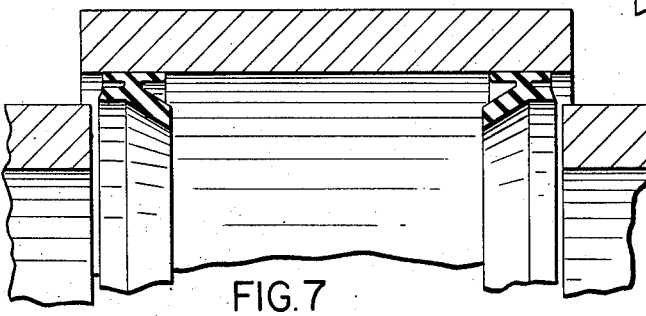
INVENTOR.
TRACY D. NATHAN
BY
ATTORNEY

United States Patent Office 2,809,853
Patented Oct. 15, 1957

2,809,853

PIPE AND SOCKET WITH FLEXIBLE LIP GASKET

Tracy D. Nathan, Cuyahoga Falls, Ohio, assignor to Hamilton Kent Manufacturing Company, a corporation of Ohio Application March 31, 1954, Serial No. 419,949

2 Claims. (Cl. 285—110)

This invention relates to resilient rings, of rubber or the like, for sealing slip-coupling pipe joints and to joints comprising such rings.

Its chief objects are to provide a ring adapted to function satisfactorily in spite of wide variations in the radial dimensions of annular spaces in which rings of the same size are used; and to provide an improved ring having self-energizing sealing elements for sealing respectively against a preponderance of pressure within the joint and a preponderance of pressure outside of the joint, as in the case of a sewer pipe, or a submerged pipe, sometimes subjected to a higher external than internal fluid pressure.

Of the accompanying drawings:

Fig. 1 is an axial section of parts of a bell-and-spigot pipe joint in position for assembly and embodying my invention in its preferred form.

Fig. 2 is a fragmentary axial section of the same at a later stage of the assembling operation.

Fig. 3 is a fragmentary section of the same with the parts in their final assembled relationship.

Fig. 4 is a fragmentary axial section corresponding substantially to Fig. 1 except that the sealing ring is preliminarily mounted in the bell instead of upon the spigot.

Fig. 5, with the same exception, corresponds substantially to Fig. 2.

Fig. 6 is a fragmentary axial section of a modification.

Fig. 7 is an axial section of another modification.

The embodiment illustrated in Figs. 1 to 3 comprises the bell 10 and the spigot 11 of a bell-and-spigot pipe joint in position to be brought together in mated relation, and a resilient sealing ring 12 mounted upon the spigot, preferably under substantial circumferential tension, for gripping the spigot, and permissibly with the ring also secured to the spigot by an adhesive.

The ring 12 comprises a generally cylindrical base portion 12a, for stability of the ring upon the spigot; a short and thin web portion 12b extending outwardly from the base portion; a short sealing-lip portion 12c projecting obliquely outward and forward from the said web portion 12b and having a maximum outer diameter slightly less than the inner diameter of the bell 10; and a longer sealing-lip portion 12d projecting obliquely outward and rearward from the web portion 12b.

The cross-sectional shape of the ring as described is such that when the spigot, with the ring thereon, is moved into the bell the forward lip 12c passes freely into the bell, without strong sealing contact therewith, until the longer, rearward lip 12d comes into contact with and begins to be wedged into the bell, as in Fig. 2. The radial depression of the rear lip by the bell causes the forward lip to move outward and press firmly against the inner face of the bell, by reason of a lever action fulcrumed upon the web portion 12b of the ring, as will be readily understood.

In the final relationship shown in Fig. 3, both of the sealing lips are pressed firmly against the inner face of the bell and the structure is such that the forward lip 12c is a self-energized sealing element with respect to a fluid of preponderating pressure within the pipe joint and the rear lip 12d is a self-energizing sealing element with respect to a fluid of preponderating pressure on the outside of the joint.

The sealing ring is adapted to be formed, by the usual procedure of extrusion and splicing, of natural or synthetic rubber or like material having appropriate physical and chemical properties.

The construction and operation of the embodiment shown in Figs. 3 and 4 correspond to those of the Figs. 1 to 3 embodiment except that the ring is mounted in the bell, with its base portion 12a outward, and with the lips 12c and 12d projecting in axial directions opposite to those of Figs. 1 to 3, so that here the shorter lip 12c will be the forward lip as the ring passes onto the spigot and will be snugged against the spigot by the outward crowding of the lip 12d by the spigot.

In the modification shown in Fig. 6, a single, conical base element 112a is integral with and is common to a plurality of sealing units each comprising a web portion 112b and self-energizing lip elements 112c and 112d, and the ring is associated with the pipe elements, 10a and 11a, of a pipe joint of the taper type, and preferably is cemented to the member 11a. The base portion 112a can be of cylindrical shape when the ring is in unstrained condition, and given the conical shape by stretching it onto the tapered end of the pipe element 11a.

It preferably is formed at its smaller end with an inwardly projecting annular flange 112e, which helps in correct positioning of the ring upon the pipe end; serves as a cushion between the two pipe ends; and, in the case of large-diameter pipe, provides to an inspector an indication as to whether the ring has been properly mounted in the assembly.

The structure and operation of the sleeve type joint of Fig. 7 will be manifest from the foregoing description of the other embodiments.

Further modifications are possible without departure from the scope of the invention as defined in the appended claims.

In the appended claims the word "rubber" is intended to be inclusive of all substances having substantially the resilient deformability of vulcanized soft-rubber.

I claim:

1. A pipe joint comprising inner and outer fluid-conducting slip-coupling members having respective annular surfaces defining between them an annular space to be sealed, the inner member having an annular end within the outer member and the outer member having an annular end surrounding the inner member, and a rubber sealing ring mounted in said space, said ring being formed with a base portion for sealing against the inner one of said members, with an annular, hinging web portion integral with said base portion at a position spaced from the latter's annular ends and with self-energizing, annular sealing flanges integral with said web portion and projecting away from it and away from each other, the two said flanges constituting a unitary lever fulcrumed on said hinging web portion, the said annular surfaces being of rectilinear form as to all of their axially extending lines throughout the extent of the annular space defined between them, the said ring being retained in position wholly by surface anchorage to said annular surfaces and the said flanges being free and unobstructed throughout their extent for self-energizing contact therewith of the respective bodies of fluid that they are to seal against, as to pressure gradients in both directions, the flange nearest to the said end of the inner member having, except for its deformation by the functioning of the said flanges as a lever, a maximum outer diameter of its sealing margin which is substantially less than the inner diameter of the outer member at the latter's said end, and the other one of said flanges having, except for its deformation, an outer diameter of its sealing margin which is substantially greater than the inner diameter of the outer member at the latter's said end.

2. A pipe joint comprising inner and outer fluid-conducting slip-coupling members having respective annular surfaces defining between them an annular space to be sealed, the inner member having an end within the outer member and the outer member having an end surrounding the inner member, and a rubber sealing ring mounted in said space, said ring being formed with a base portion for sealing against the outer one of said members, with an annular, hinging web portion integral with said base portion at a position spaced from the latter's ends, and with self-energizing annular sealing flanges integral with said web portion and projecting away from it and away from each other, the two said flanges constituting a unitary lever fulcrumed on said hinging web portion, the said annular surfaces being of rectilinear form as to all of their axially extending lines throughout the extent of the annular space defined by them, the said ring being retained in position wholly by surface anchorage to said annular surfaces and the said flanges being free and unobstructed throughout their extent for self-energizing contact therewith of the respective bodies of fluid that they are to seal against, as to pressure gradients in both directions, the flange nearest to the said end of the outer member having, except for its deformation by the functioning of the said flanges as a lever, a minimum inner diameter of its sealing margin which is substantially greater than the outer diameter of the inner member at the latter's said end, and the other one of said flanges having, except for its deformation, an inner diameter of its sealing margin which is substantially less than the outer diameter of the inner member at the latter's said end.

References Cited in the file of this patent

UNITED STATES PATENTS

| | | |
|---|---|---|
| 1,690,047 | Armbruster | Oct. 30, 1928 |
| 2,165,052 | Hering | July 4, 1939 |
| 2,210,833 | Clough | Aug. 6, 1940 |
| 2,226,067 | Morgan | Dec. 24, 1940 |
| 2,277,922 | McMurray | Mar. 31, 1942 |
| 2,506,069 | Dalton | May 2, 1950 |
| 2,615,741 | Nathan | Oct. 28, 1952 |

OTHER REFERENCES

Ser. No. 239,149, P. Boissou (A. P. C.), published May 25, 1943.